(12) United States Patent
De Ridder et al.

(10) Patent No.: US 6,194,476 B1
(45) Date of Patent: Feb. 27, 2001

(54) COMPRESSIBLE SILICONE COMPOSITION

(75) Inventors: Lucrece De Ridder, Ghent; Jean-Paul Mollie, Marke, both of (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 09/348,936

(22) Filed: Jul. 7, 1999

(30) Foreign Application Priority Data

Jul. 10, 1998 (GB) .................................................. 9815080

(51) Int. Cl.$^7$ ................................. C08J 9/32; B01J 13/02
(52) U.S. Cl. ............................ 521/54; 521/154; 523/219
(58) Field of Search ....................... 521/54, 154; 523/219

(56) References Cited

U.S. PATENT DOCUMENTS

| | | | |
|---|---|---|---|
| 3,615,972 | 10/1971 | Morehouse et al. .................... | 156/79 |
| 3,864,181 | 2/1975 | Wolinski et al. ....................... | 156/79 |
| 4,006,273 | 2/1977 | Wolinski et al. ..................... | 427/278 |
| 4,044,176 | 8/1977 | Wolinski et al. ..................... | 427/256 |
| 4,397,799 | 8/1983 | Edgren et al. .......................... | 264/53 |
| 4,513,106 | 4/1985 | Edgren et al. .......................... | 521/58 |
| 4,722,943 | 2/1988 | Melber et al. .......................... | 521/57 |
| 4,829,094 | 5/1989 | Melber et al. .......................... | 521/57 |
| 4,843,104 | 6/1989 | Melber et al. .......................... | 521/54 |
| 4,861,804 | 8/1989 | Nakanishi .............................. | 521/54 |
| 5,258,212 | 11/1993 | Tomaru et al. ...................... | 428/36.8 |

FOREIGN PATENT DOCUMENTS 0 771 842 A1   5/1997   (EP)   ................................. C08K/7/22

*Primary Examiner*—Morton Foelak
(74) *Attorney, Agent, or Firm*—Larry A. Milco

(57) ABSTRACT

A compressible silicone composition formable from a silicone gel-forming composition and a hollow compressible filler which is adapted to be used in an electrically insulating seal. The compressible silicone composition comprises a mixture of organosilicon compounds which can crosslink to form a silicone gel and hollow compressible microspheres.

5 Claims, No Drawings

COMPRESSIBLE SILICONE COMPOSITION

The present invention relates to use of a compressible silicone composition, in particular use of a compressible silicone composition formable from a silicone gel-forming composition and hollow compressible filler for providing an electrically insulating seal.

Silicones have, in general, many well known advantages over organic polymers, for example high temperature resistance, low surface tension, high chemical resistance, low toxicity, high moisture resistance, high dielectric strength and high flame resistance. However, a disadvantage silicones have, in general, versus organic polymers is their high coefficient of thermal expansion. For example, when a silicone elastomer is used to fill a space of fixed volume, an increase in environmental temperature will result in the silicone elastomer causing undue mechanical stress on the surface(s) defining the space. It is known to fill silicone rubber compositions with hollow compressible microspheres to counteract effects caused by thermal expansion; when the silicone rubber expands within a space of fixed volume the microspheres compress under the force exerted thus reducing the stress on the surface(s) defining the space. For example, U.S. Pat. No. 5,258,212 discloses a curable liquid silicone rubber-forming composition which comprises fine hollow microspheres and which has good vibration damping characterisics for use in packing for electronic components, and EP-A-0771842 discloses a silicone rubber composition for forming articles and sealing bodies, which composition comprises a cross-linkable silicone rubber-forming composition and hollow bodies of plastic. Such silicone compositions filled with hollow bodies can be from 20 to 40 times more compressible than the corresponding unfilled composition, and thus provide a silicone composition which has the aforementioned advantages of silicones as well as high compressibility to counteract the effects of high thermal expansion. For brevity, compositions containing compressible hollow bodies will hereinafter be referred to as "compressible" compositions.

However, the present inventors have found disadvantages in using compressible silicone rubber compositions. For example, if a cavity is required to be 100% filled with a compressible silicone composition (for example, where a gas-tight seal is required within the cavity or where the compressible silicone is acting as an electrical insulator within the cavity) over a wide temperature range, environmental temperature decrease will cause a compressible silicone rubber composition to shrink within the cavity. As shrinkage occurs, separation of the compressible silicone rubber from the cavity walls can occur resulting in gaps appearing between the compressible silicone composition and the cavity walls. The cavity would thus no longer be gas-tight or electrically insulated.

We have now found that if a silicone gel-forming composition is used in the formation of a compressible silicone composition instead of a prior art silicone rubber-forming composition then the aforementioned advantages of the prior art compositions are kept but the disadvantages of compressible silicone rubbers are reduced.

According to the present invention there is provided use of a silicone gel-forming composition for providing an electrically insulating seal, which silicone gel-forming composition comprises a mixture of organosilicon compounds which can crosslink to form a silicone gel and hollow compressible microspheres.

Silicone gels are well known in the art, and are often characterised by their physical properties, as they usually have a relatively high flexibility and penetration. For example, U.S. Pat. No. 4,861,804 discloses a silicone gel composition containing hollow microspheres for use as a shock absorbing material or as a sound and vibration-proof material. They tend to be flowable under pressure, have some tackiness and sometimes are self-healing. Such physical properties result from the low crosslink density of silicone gels relative to the much higher crosslink densities of other types of silicone elastomers, such as silicone rubbers. Crosslinkable silicone gel-forming compositions usually comprise a siloxane polymer and organosilicon crosslinker, and an organosilicon crosslinker both having reactive groups which allow reaction of the polymer with the crosslinker. The crosslink density the number of reactive groups of the siloxane polymer which react with reactive groups of the organosilicon crosslinker.

Thus, the aforementioned physical properties of a silicone gel are desirable and may be achieved by controlling the crosslink density to keep it at a suitably low level, and this may be achieved in a number of ways. For example, where said organosilicon compounds comprise a siloxane polymer and an organosilicon crosslinker, a low crosslink density may be achieved by having an excess of siloxane polymer reactive groups compared to organosilicon crosslinker reactive groups. This ensures that some siloxane polymer reactive groups will always remain unreacted. An organosilicon crosslinker reactive group/siloxane polymer reactive group ratio of 0.5/1 to 1/1 is typical for silicone gel formation.

Another way of achieving a low crosslink density is to have a low total number of reactive groups available for crosslinking, i.e. substantially all of the available reactive groups do undergo a crosslinking reaction but are only present in sufficient numbers to result in a low crosslink density. For example, the siloxane polymer may have only terminal reactive groups together with a relatively high viscosity giving a greater distance between reactive groups, or the crosslinker may have a reduced number of reactive sites.

A further way of achieving a low crosslink density is to employ a suitable inhibitor or catalyst deactivator to inhibit crosslinking from proceeding once a desired crosslink density has been reached. Which particular inhibitor to use will depend on the particular crosslinking mechanism in question. Such inhibitors are well known to the skilled person and include acetylenic alcohols, alkyl maleates, alkyl fumarates, organic peroxides, sulphoxides, amines, amides, phosphines, phosphites, nitrites and oximes.

Preferred organosilicon compounds for use in the silicone-gel forming composition according to the present invention comprise a siloxane polymer an organosilicon crosslinker.

Useful siloxane polymers comprise units of the general formula $R_aR'_bSiO_{(4-a-b)/2}$ (I), wherein R is a monovalent hydrocarbon group having up to 18 carbon atoms, R' is a monovalent hydrocarbon or hydrocarbonoxy group, a hydrogen atom or a hydroxyl group, a and b each have a value of from 0 to 3, with the sum of a+b being no more than 3.

Preferably the siloxane polymers are substantially linear polyorganosiloxanes having the general structure (II)

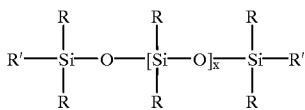

(II)

wherein R and R' have the same meaning as above, and wherein x is an integer, preferably having a value of from 10 to 1500. It is particularly preferred that R denotes an alkyl or aryl group having from 1 to 8 carbon atoms, e.g. methyl, ethyl, propyl, isobutyl, hexyl, phenyl or octyl. More preferably at least 50% of all R groups are methyl groups, most preferably substantially all R groups are methyl groups. R' may be an alkoxy group, for example having up to 3 carbon atoms, but is preferably selected from an aliphatically unsaturated hydrocarbon group or a hydrogen atom. More preferably R' denotes an alkenyl group having up to 6 carbon atoms, more preferably vinyl, allyl or hexenyl, suitable for addition reactions. A mixture of siloxane polymers may be used, for example a mixture of higher and lower visosity polymers, e.g. a first siloxane having a visosity at 25° C. of from approximately 500 mm2/s to 2500 mm$^2$/s and a second siloxane having viscosity at 25° C. of from 5000 mm$^2$/s to 50000 mm$^2$/s.

Organosilicon crosslinkers may be selected from silanes, low molecular weight organosilicon resins and short chain organosiloxane polymers. The crosslinker has at least 3 silicon-bonded substituents which are capable of reacting with the silicon-bonded group R' of the polymer described above. Where the group R' is a hydroxyl or alkoxy group, it is preferred that the reactive substituents on the organosilicon crosslinker are either alkoxy groups or hydroxyl groups, allowing the condensation reaction to occur between the two components according to the general reaction scheme (III) or (IV), wherein R* denotes an alkyl group:

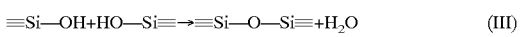 (III)

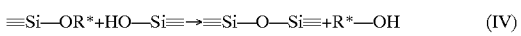 (IV)

Where the group R' in the polymer is an alkenyl group, it is preferred that the reactive substituents on the organosilicon crosslinker are hydrogen atoms, allowing addition reaction between the organosilicon crosslinker and the polyorganosiloxane, according to the general reaction scheme (V), wherein R" is a divalent hydrocarbon group and c is 0 or 1.

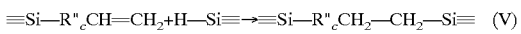 (V)

Alternatively, the group R' in the polymer may be a hydrogen atom and the reactive substituents R* on the organosilicon crosslinker may be alkenyl groups.

Suitable silanes which may serve as cross-linking organosilicon compounds include alkyltrialkoxy silane, e.g. methyltrimethoxy silane, ethyltrimethoxy silane and methyltriethoxy silane. Suitable organosilicon resin compounds include organosilicon resins consisting mainly of tetrafunctional siloxane units of the formula SiO$_{4/2}$ and monofunctional units R$_v$R°$_w$SiO$_{1/2}$, wherein R is as defined above, R° denotes a silicon-bonded substituent which may react with R' as discussed above, v and w each have a value of from 0 to 3, the sum of v+w being 3. Suitable short chain organosiloxane polymers include short chain polyorganosiloxanes having at least 3 silicon-bonded alkoxy, hydroxyl or hydrogen atoms per molecule, e.g. trimethylsiloxane endblocked polymethylhydrosiloxane having up to 20 carbon atoms, tetramethylcyclotetrasiloxane and silanol endblocked dimethylsiloxane-methylsilanol copolymers.

In addition to the siloxane polymers and the organosilicon cross-linking compounds, the silicone gel-forming compositions preferably also comprise a suitable catalyst, selected according to the cross-linking mechanism employed. For silicone gel-forming compositions which are based on curing by condensation (reactions (III) and (IV) above), suitable condensation catalysts include tin or titanium based components, e.g. dialkyltin dicarboxylic acids and tetraalkyl titanates. For the silicone gel-forming compositions which cure by addition reaction (reaction (V) above), it is preferred to use a Group VIII metal-based catalyst, e.g. platinum chloride, or compounds or complexes of platinum or rhodium.

The preferred organosilicon compounds for use in the silicone-gel forming composition cure via an addition reaction. Particularly preferred is a composition which comprises an polyorganosiloxane having at least 2 silicon-bonded alkenyl groups per molecule, preferably vinyl, an organosilicon crosslinker having at least 3 silicon-bonded hydrogen atoms, and a Group VIII based catalyst. The ratio of these components in the silicone gel-forming composition should be such as to ensure a low crosslink density, for example the alkenyl-functional polyorganosiloxane polymer and the organosilicon cross-linker having silicon-bonded hydrogen atoms are preferably present in a ratio which will ensure that at least one alkenyl group is present per silicon-bonded hydrogen atom, more preferably that the ratio of alkenyl groups/silicon-bonded hydrogen atoms is from 1/1 to 2/1. Preferred organosilicon compounds for use in the silicone gel-forming composition include a first dimethylvinylsilyl-terminated polydimethylsiloxane having a viscosity of from 500 to 2,500 mm$^2$/s at 25° C., a second dimethylvinylsilyl-terminated polydimethylsiloxane having a viscosity of from 7,500 to 10,000 mm$^2$/s at 25° C., trimethylsilyl-terminated dimethylmethylhydrogenpolysiloxane and a platinum catalyst.

The silicone-gel forming composition also comprises hollow compressible microspheres. The microspheres are expanded hollow bodies of plastic based on thermoplastic organic polymers, for example polyacrylonitriles, polyvinyl chlorides, polyvinylacetates, polyesters, polycarbonates, polyethylenes, polystyrenes, polymethyl methacrylates, polyvinyl alcohols, ethylcellulose, nitrocellulose, benzylcellulose, epoxy resins, hydroxypropylmethylcellulose phthalate, copolymers or vinyl chloride and vinyl acetate, copolymers of styrene and maleic acid, copolymers of acrylonitrile and styrene, and copolymers of vinylidene chloride and acrylonitrile. Hollow microspheres, methods for their manufacture, and information concerning their properties and uses are described in U.S. Pat. Nos. 3,615,972, 3,864,181, 4,006,273, 4,044,176, 4,397,799, 4,513,106, 4,722,943, 4,843,104 and 4,829,094.

The microspheres preferably have an average diameter of from 10 to 100 µm, more preferably from 15 to 80 µm, and are preferably present in a compressible silicone gel-forming composition in an amount of from 1 to 20% by weight, more preferably 1 to 5% by weight. Suitable commercially available microspheres include those sold under the trade mark Dualite® by Pierce and Stephens Corp., and those sold under the trade mark Expancel® by Akzo Nobel.

The microspheres may be mixed with the organosilicon compounds used in the present invention using conventional mixing equipment. The preferred microspheres have a powder-like consistency and can thus be pumped, like a fluid, into a mixing system. They are also resilient and can withstand high-shear mixing conditions. After mixing, some of the microspheres may "float" to the surface of the silicone gel-forming composition due to their low density. This is called "float-out" and can be reduced, for example, by keeping the mixture of microspheres and organosilicon compounds under mild agitation or by adding a surfactant to the composition.

Further additional ingredients which may be included in the silicone gel-forming composition includes fillers, dispersing agents, adhesion promoters, inhibitors, pigments, dyeftuffs, flame retardants, plasticisers and nonionic and anionic surfactants.

The silicone gel-forming compositions comprise organosilicon compounds which can crosslink to form a silicone gel, as opposed to a silicone rubber. Silicone gels are often characterised by their physical properties, such as relatively high flexibility and penetration. For example, the compositions of the present invention will typically have a penetration (as measured by the method described in Example below) of from 0.1 to 20 mm, preferably from 1 to 5 mm. This is to be compared with silicone rubbers which will typically have a considerably lower penetration which is measurable on the Shore A scale.

Herein, penetration of the silicone gels has been measured by the following method. A blunt head shaft, 19.5 g total mass, head 4.8 mm by 6.4 mm diameter, attached to a Universal penetrometer from Precision Instruments, Chicago, Ill., was lowered onto a cured silicone gel sample at room temperature without marking the sample. The head was then released and allowed to penetrate the sample for 5 seconds. The head is then removed from the sample and the depth of the indentation made by the head in the sample was measured and recorded(mm).

The silicone gel-forming composition can crosslink at room temperature by allowing it to stand at room temperature for 24 hours, although accelerated crosslinking is possible, for example by heating at 100° C. for 1 hour.

The inventors have found that compressible silicone gel formed from the silicone gel-forming compositions used in the present invention has particular utility and advantage for plugging cavities, and in particular, due to the high dielectric strength of the silicone gel, as a filler for high voltage insulators which are exposed to high variations in environmental temperatures, for example from −40° C. to +70° C. Typically, the silicone gel-forming composition will initially be prepared in two parts of substantially equal weight, a first part comprising siloxane polymer, crosslinking catalyst and microspheres, and a second part comprising siloxane polymer, organosilicon crosslinker and microspheres. Each part may then be homogenised by conventional means to ensure thorough mixing of the microspheres with the organosilicon compounds, and the first and second parts are then mixed together and pumped into the cavity to be filled, for example a high voltage insulator. The composition is then allowed to cure as described hereinabove to form a silicone gel. An advantage of the present silicone gel over the compressible silicone rubber compositions of the prior art is the higher tackiness and flexibility of silicone gels over silicone rubbers. Thus, the compressible silicone gel will more effectively engage the cavity walls. A further advantage of the compressible silicone gel is that a cavity can be plugged with the silicone gel under pressure, i.e. in a compressed state. As a result, if atmospheric temperature decreases, any thermal contraction of the silicone gel within the cavity due to the decrease in environmental temperature will be counteracted by its expansion due to decompression within the cavity. Thus, gaps should not appear between the silicone gel and the cavity walls when environmental temperature decreases. This ability to expand as a result of decompression within the cavity as environmental temperature decreases is possible due to the particular mechanical properties of silicone gel and is not possible with silicone rubber, especially when the material is constructed in situ.

Other applications for the silicone gel-forming compositions of the first aspect of the present invention include encapsulation of electronic and electrical components and devices, sealing and gasketing applications, shock and vibration damping and acoustic insulation, cavity encapsulation/insulation, thermal insulation, applications in the construction industry, pressure sensitive adhesives and medical applications.

The present invention will now be described in detail by way of example.

EXAMPLE 1 preparation of silicone gel-forming composition

A silicone gel-forming composition was prepared in two parts by mixing together the following organosilicon compounds (percentages are by weight unless otherwise indicated and viscosity is given for 25° C.):

Part A:
  75% dimethylvinyl-terminated polydimethylsiloxane, approx. 9000 mm$^2$/s;
  20% dimethylvinyl-terminated polydimethylsiloxane, approx. 2000 mm$^2$/s;
  4% (30.8 vol. %) Dualite M 6050 AE, microspheres, approx. 70 μm diameter
  0.1% Platinum-containing catalyst Part B:
  75% dimethylvinyl-terminated polydimethylsiloxane, approx. 9000 mm/s;
  20% dimethylvinyl-terminated polydimethylsiloxane, approx. 2000 mm$^2$/s;
  4% (30.8 vol.%) Dualite M 6050 AE, microspheres, approx. 70 μm diameter
  0.75% trimethyl-terminated dimethylmethylhydrogensiloxane, approx 5 mm$^2$/s;

Part A and Part B were homogenised, and mixed to form a silicone gel-forming composition having a viscosity of approximately 15000 mm$^2$/s at 25° C. and a specific gravity of 0.77 g/cm$^3$.

EXAMPLE 2 compressibility and recovery

Seven test samples of a silicone gel were prepared from the silicone gel-forming composition described in Example 1 above as follows. Cylindrical glass fibre reinforced hollow insulator tubes of approximately 10 cm diameter and 10 cm height were filled with the silicone gel-forming composition described in Example 1 above and left to stand at room temperature for 24 hours to give a silicone gel having a penetration of 1 mm and a coefficient of thermal expansion of approximately 550 ppm/K. The cured silicone gel was then tested for compressibility and recovery by applying pressure thereto with a plunger. The tests were performed at room temperature apart from test 7 which was performed at minus 40° C. The test results are shown in Table 1 below:

TABLE 1

| Test number | Applied pressure (kPa) | Pressure exposure time (hrs) | % volume compression | % volume recovery |
| --- | --- | --- | --- | --- |
| 1 | 1613 | 1 | 11.4 | 100 |
| 2 | 2420 | 1.5 | 20.3 | 100 |
| 3 | 2420 | 64 | 20.0 | 95 |
| 4 | 1613 | 65 | 10.0 | 99.5 |
| 5 | 10800 | 0.17 | 29.7 | 97 |
| 6 | 1350 | 113 | 10 | 96 |
| 7 | 2000 | 170 | 20 | 99 |

EXAMPLE 3 dielectric properties

The dielectric properties of the silicone gel prepared in Example 1 above were tested as follows.

A "Faraday cage" type box was prepared containing two parallel plate electrodes having plane opposing faces separated by a measured distance and having connections leading to outside of the box. The plane opposing faces of the electrodes provide a uniform electric field therebetween when a potential difference is provided thereacross. The box was filled with silicone gel-forming composition of Example 1 above, ensuring that no air gaps were present, and left to stand at room temperature for 24 hours for the silicone-gel forming composition to crosslink. The electrodes were then connected to a high voltage power source and the potential difference increased until dielectric breakdown occurred.

This test was repeated with one of the plate electrodes replaced by a sharp point electrode to provide a non-uniform electric field therebetween when a potential difference is provided between the plate and the point.

The results of the above tests for uniform and non-uniform electric fields and different separations are given in Table 2 below.

TABLE 2

|  | Distance (mm) | Breakdown voltage |
|---|---|---|
| Uniform field | 2.5 | 50,000 |
|  | 5.0 | 80,000 |
| Non-uniform field | 3.0 | 18,000 |
|  | 5.0 | 32,000 |

A further test was performed to measure the dielectric properties of the silicone gel over time. Boxes containing parallel plate electrodes were filled with silicone gel as described above and a constant voltage was applied between the electrodes The time taken for dielectric breakdown to occur was measured, and the results are given in Table 3 below.

TABLE 3

| Applied Voltage (kV) | Time elapsed at breakdown (s) |
|---|---|
| 27.5 | 34459 |
| 33 | 10790 |

What is claimed is:

1. A method of forming an electrically insulating seal, comprising:

(A) filling a cavity with a silicone gel-forming composition comprising a siloxane polymer, an organosilicon crosslinker, and hollow compressible microspheres; and (B) curing the composition.

2. The method according to claim 1, wherein the cavity is in a high voltage insulator.

3. The method according to claim 1, wherein the silicone gel-forming composition cures by condensation.

4. The method according to claim 1, wherein the silicone gel-forming composition cures by an addition reaction.

5. The method according to claim 1, wherein the hollow compressible microspheres have an average diameter of from 10 to 100 $\mu$m.

* * * * *